No. 689,546.  
W. J. HOSACK.  
TIRE HEATER.  
(Application filed Oct. 11, 1901.)
Patented Dec. 24, 1901.
(No Model.)
Fig. I.
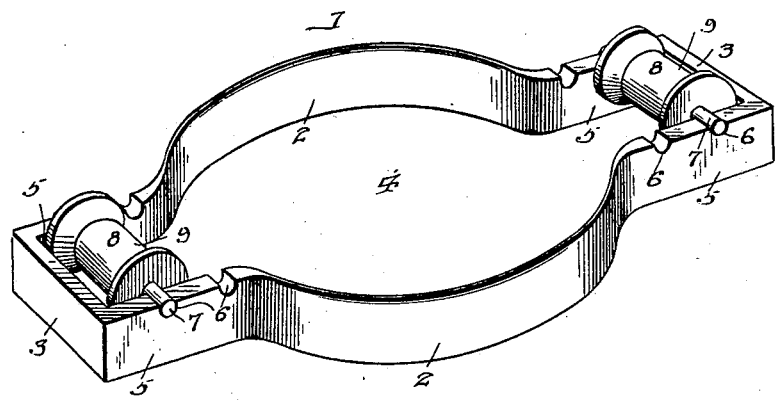
Fig. 2.
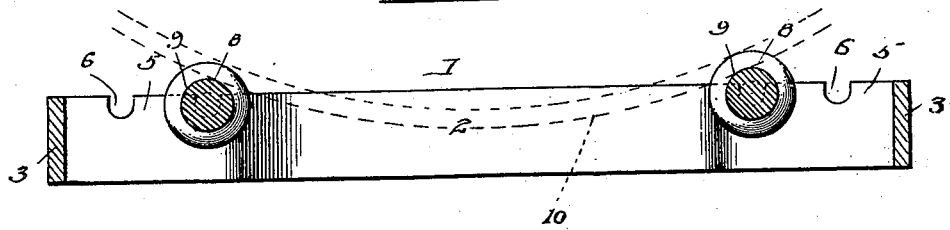
Fig. 3.
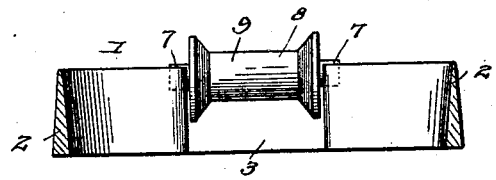
Witnesses  
F. E. Alden  
H. F. Riley
W. J. Hosack Inventor  
by C. A. Snow & Co.  
Attorneys

UNITED STATES PATENT OFFICE.

WILLIAM J. HOSACK, OF ROUNDHEAD, OHIO.

TIRE-HEATER.

SPECIFICATION forming part of Letters Patent No. 689,546, dated December 24, 1901.

Application filed October 11, 1901. Serial No. 78,371. (No model.)

*To all whom it may concern:*

Be it known that I, WILLIAM J. HOSACK, a citizen of the United States, residing at Roundhead, in the county of Hardin and State of Ohio, have invented a new and useful Tire-Heater, of which the following is a specification.

The invention relates to improvements in tire-heaters.

The object of the present invention is to improve the construction of tire-heaters, more especially the means for supporting a tire while it is being heated, and to provide a simple, inexpensive, and efficient device designed to be arranged around the fire of a blacksmith's forge and adapted to hold the coals on the fire and to prevent the latter from being scattered while a tire is being heated.

Another object of the invention is to provide a device of this character which will enable a tire to be uniformly heated and which will prevent the same when turned in a fire from sinking too deeply therein or having portions of it heated to too great a degree.

The invention consists in the construction and novel combination and arrangement of parts hereinafter fully described, illustrated in the accompanying drawings, and pointed out in the claims hereto appended.

In the drawings, Figure 1 is a perspective view of a tire-heater constructed in accordance with this invention. Fig. 2 is a longitudinal sectional view of the same. Fig. 3 is a transverse sectional view.

Like numerals of reference designate corresponding parts in all the figures of the drawings.

1 designates a frame composed of sides 2 and ends 3 and provided with a central circular portion 4, adapted to be placed around the fire of a blacksmith's forge and forming opposite walls to retain the fire in proper shape and prevent the same from falling back or away from the tire when the latter is rotated to bring different portions of it into the fire. The sides 2 are bowed outward intermediate of their ends to form the curved walls, which are slightly tapered from their lower to their upper edges, as clearly shown in Fig. 3 of the accompanying drawings. The end portions 5 of the sides 2 are arranged parallel with each other and with the ends 3 form substantially rectangular extensions of the frame, and the said parallel portions of the sides are provided at their upper edges with bearing-recesses 6 for the reception of journals 7 of tire-supporting rollers 8. The tire-supporting rollers 8, which are located at the ends of the frame, fit between the parallel portions of the sides 2 and are adapted to be adjusted to and from each other to arrange the device for tires of different sizes, so that the tire will set properly in the fire, and by reason of the rollers extending downward into the frame they are securely held against lateral displacement. The rollers are preferably flanged at their ends to provide an intermediate tire-receiving recess or groove 9 to prevent the tire from slipping laterally. The tire 10, as illustrated in Fig. 2 of the drawings, is adapted to be placed upon the rollers, which support it over the fire and which enable it to be readily rotated to bring different portions of it into the fire, so that any portion of the tire may be heated.

The device is adapted to be placed around the fire of a blacksmith's forge, and it may be readily removed therefrom when it is not required. The sides and ends may be formed integral with each other, as illustrated in the accompanying drawings, or the frame may be made in sections and may be constructed of any suitable metal or other indestructible material. The rollers are especially adapted for use in connection with light buggy-tires, which must be evenly heated throughout, so that no portion of the tire will burn the wooden rim or felly, and in order to accomplish this result the tire must pass through the fire with a slow steady motion, which may be readily effected by means of the frames and the rollers. The device will prevent the tire from getting too deep in the fire and will also avoid scattering the latter.

It will be seen that the device is exceedingly simple and inexpensive in construction, that it is adapted to be readily placed on and removed from the fire of a blacksmith's forge, and that it will support a tire in a fire and prevent it from sinking too deeply therein. It will also enable a tire to be uniformly heated, and it will hold the coals in place and prevent the fire from being scattered.

What is claimed is—

1. A device of the class described comprising a horizontal frame adapted to be placed upon the ground and having a central open portion adapted to be placed around a fire, said frame being provided at opposite sides of the central portion with extensions and rollers carried by the frame and arranged at the said extensions to receive the tire to be heated, substantially as described.

2. A device of the class described comprising a horizontal frame consisting of an enlarged circular central portion and end extensions, the central portion being adapted to be placed around a fire, and rollers mounted in the end extensions of the frame, and arranged to receive a tire, substantially as described.

3. A device of the class described comprising a horizontal frame consisting of a circular central portion, and approximately rectangular end portions and adapted to be placed around the fire, and rollers mounted in the end portions of the frame, substantially as described.

4. A device of the class described comprising a frame, composed of sides having outwardly-bowed central portions and provided with straight end portions having bearing-recesses at their upper edges, and the ends connecting the sides, and the tire-receiving rollers arranged between the end portions of the sides and provided with journals adapted to fit in the said bearing-recesses, whereby the rollers may be adjusted to and from each other, substantially as described.

In testimony that I claim the foregoing as my own I have hereto affixed my signature in the presence of two witnesses.

WILLIAM J. HOSACK.

Witnesses:
ROLLA H. VALENTINE,
EDWARD H. MAINS.